US006827604B1

United States Patent
White

(10) Patent No.: US 6,827,604 B1
(45) Date of Patent: Dec. 7, 2004

(54) ONE-PIECE SNAP-IN CONNECTOR FOR ELECTRICAL JUNCTION BOX

(75) Inventor: Robert R. White, Salem, OH (US)

(73) Assignee: Halex/Scott Fetzer Company, Bedford, OH (US)

( * ) Notice: Subject to any disclaimer, the term of this patent is extended or adjusted under 35 U.S.C. 154(b) by 0 days.

(21) Appl. No.: 10/669,489

(22) Filed: Sep. 23, 2003

(51) Int. Cl.[7] ............................................... H01R 13/73
(52) U.S. Cl. ....................... 439/557; 174/65 R; 439/552
(58) Field of Search ................................ 439/557, 552, 439/569; 174/65 R

(56) References Cited

U.S. PATENT DOCUMENTS

| | | | |
|---|---|---|---|
| 4,012,578 A | * | 3/1977 | Moran et al. .................. 174/51 |
| 4,180,227 A | | 12/1979 | Gretz |
| 5,171,164 A | | 12/1992 | O'Neil et al. |
| 5,204,499 A | | 4/1993 | Favalora |
| 5,266,050 A | | 11/1993 | O'Neil et al. |
| 5,373,106 A | | 12/1994 | O'Neil et al. |
| 5,539,152 A | | 7/1996 | Gretz |
| 5,775,739 A | | 7/1998 | Gretz |
| D404,362 S | | 1/1999 | Auray et al. |
| 6,043,432 A | | 3/2000 | Gretz |
| 6,080,933 A | | 6/2000 | Gretz |
| 6,100,470 A | | 8/2000 | Gretz |
| 6,114,630 A | | 8/2000 | Gretz |
| 6,133,529 A | * | 10/2000 | Gretz ........................ 174/65 R |
| 6,177,633 B1 | | 1/2001 | Gretz |
| 6,194,661 B1 | | 2/2001 | Gretz |
| 6,310,290 B1 | | 10/2001 | Gretz |
| 6,335,488 B1 | | 1/2002 | Gretz |
| 6,352,439 B1 | | 3/2002 | Stark et al. |
| 6,421,833 B2 | * | 7/2002 | Khanamirian et al. ........... 2/69 |

* cited by examiner

*Primary Examiner*—P. Austin Bradley
*Assistant Examiner*—X. Chung-Trans
(74) *Attorney, Agent, or Firm*—Pearne & Gordon LLP

(57) ABSTRACT

A one-piece, zinc die cast electrical connection fitting for a junction box characterized by snap-in locking fingers positioned 180° apart on the leading or the insertion end of the fitting and tensioning fingers on either side of the locking fingers.

3 Claims, 2 Drawing Sheets

ONE-PIECE SNAP-IN CONNECTOR FOR ELECTRICAL JUNCTION BOX

FIELD OF THE INVENTION

The present invention relates generally to electrical connectors, and more specifically to a new and improved snap-in connector for electrical junction boxes and the like.

BACKGROUND OF THE INVENTION

Snap-in connectors have been used to connect flexible metallic conduit and metal clad cable to electrical junction boxes. These connectors are an improvement over the prior use of lock nuts that are threaded on the end of an electrical fitting extending through a hole into the interior of the box.

U.S. Pat. No. 5,171,164, dated Dec. 15, 1992, discloses a snap-in connector consisting of a zinc die cast fitting that carries a spring steel adaptor ring designed to secure the fitting to a junction box. The split ring spring steel adaptor is formed with three radially outwardly bent locking tabs and three radially outwardly bent tensioning fingers. In use, the end of the zinc die cast fitting carrying the spring steel adaptor is pushed through an opening in the junction box until the locking tabs clear the edge of the opening and spring outwardly against the inner wall surface of the box, thereby preventing the fitting from being withdrawn. The tensioning fingers press against the edge of the opening to exert tension between the spring steel adaptor and the inner circumference of the opening in the box.

As disclosed in U.S. Pat. No. 5,171,164, the spring steel adaptor ring requires separate manufacturing and assembly operations. A stamping is made with the outwardly bent tabs and fingers. The stamping is then bent into a split ring which must assembled onto the zinc die cast fitting.

SUMMARY OF THE INVENTION

An object of the present invention is to provide a quick connect fitting for an electrical junction box consisting of a one-piece, zinc die cast fitting having the snap-in capability described in U.S. Pat. No. 5,171,164 without requiring a separately formed, split ring spring steel adaptor.

The invention is based on the discovery that it is possible to make a one-piece, zinc die cast fitting with flexible locking fingers or tabs and tensioning fingers by locating the locking fingers 180° apart and forming the tensioning fingers adjacent to and on either side of each locking finger. The one-piece construction of the invention eliminates the need for making a split ring steel adaptor in manufacturing operations separate from the zinc die casting and then assembling the ring onto the die cast fitting.

In a preferred and disclosed embodiment, the snap-in connector of this invention is a one-piece die cast member having a cylindrical end portion, an outer radial collar, two locking fingers or tabs spaced 180° apart that spread outwardly from the cylindrical end portion toward the collar, the locking fingers having free ends that are spaced from the collar and can be flexed radially inwardly, and tensioning fingers formed in the cylindrical leading end portion adjacent to and on each side of the locking fingers. The tensioning fingers spread outwardly from the leading end portion toward the collar and have free ends that can be flexed radially inwardly. In use, the locking and tensioning fingers are flexed radially inwardly by inserting the leading end portion of the die cast fitting through an opening in the wall of a junction box until the free ends of the locking fingers are completely through the opening end and flex outwardly to engage the inside wall surface of the box, thereby preventing the fitting from being withdrawn. The free ends of the tensioning fingers remain engaged with the edge of the box opening in order to center and form a firm connection between the fitting and the box.

Because of the placement of the locking and tensioning fingers, it is possible to form the fingers as integral parts of the zinc die casting. Even though they are an integral part of the die casting, the fingers have the flexibility necessary to provide a secure snap-in connection. Thus, the construction eliminates the need for a separately formed spring steel adaptor that heretofore has been considered necessary to achieve a snap-in connection.

Other advantages and a fuller understanding of the invention will be apparent to those skilled in the art from the following detailed description and the accompanying drawings.

DESCRIPTION OF PREFERRED EMBODIMENT

Figure 1:
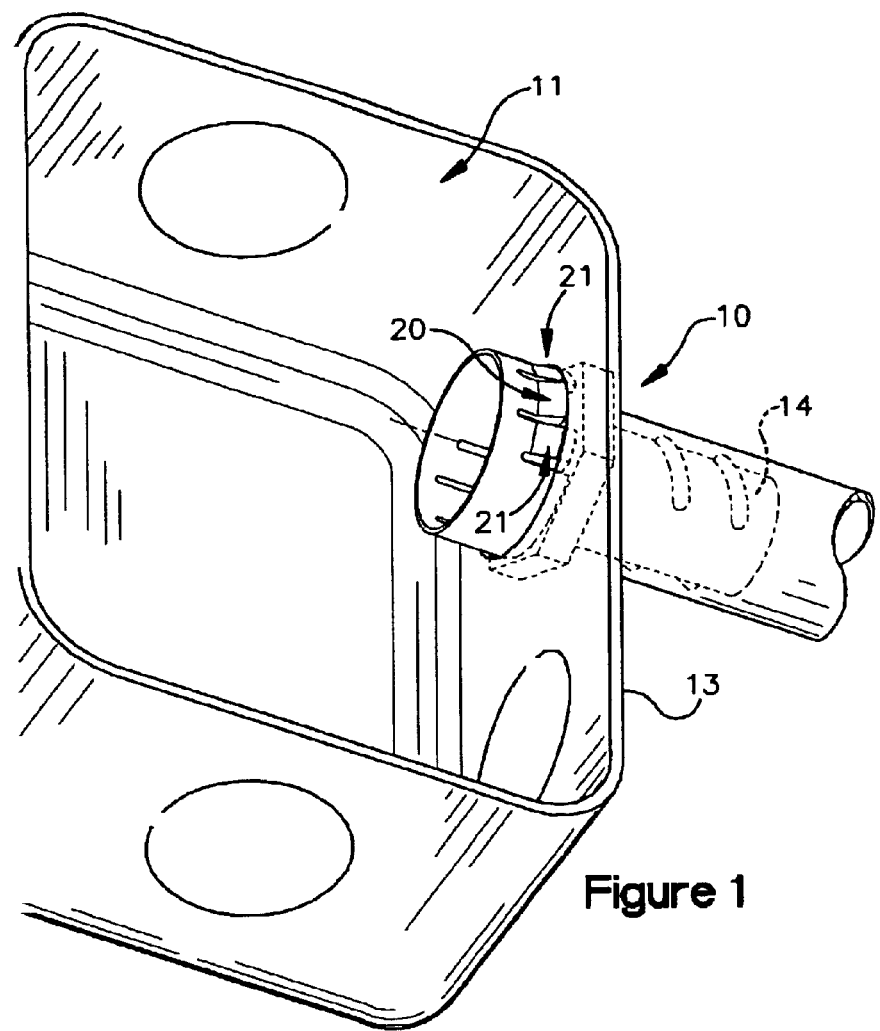
FIG. 1 is a perspective view showing the die cast fitting of the invention assembled to a junction box.
Figure 2:
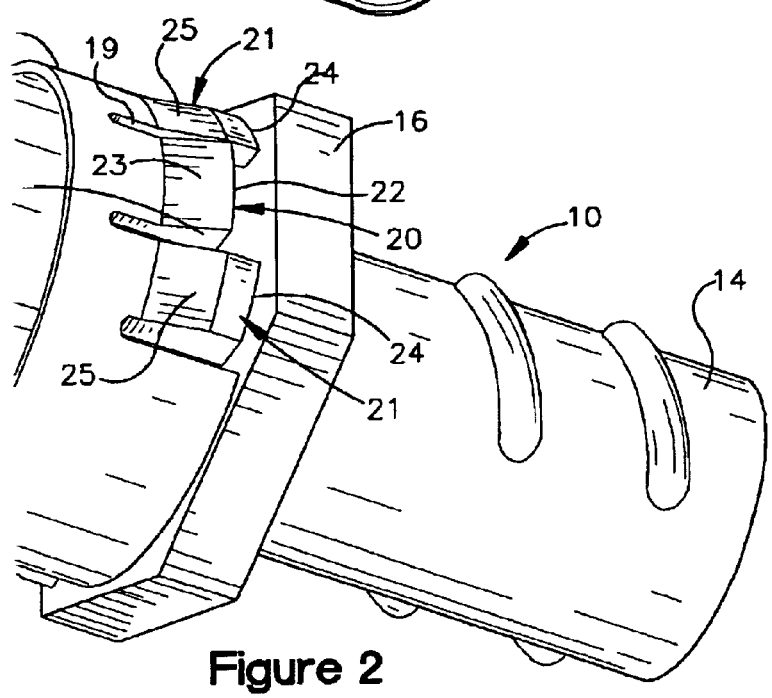
FIG. 2 is a perspective view of the die cast fitting.
Figure 3:
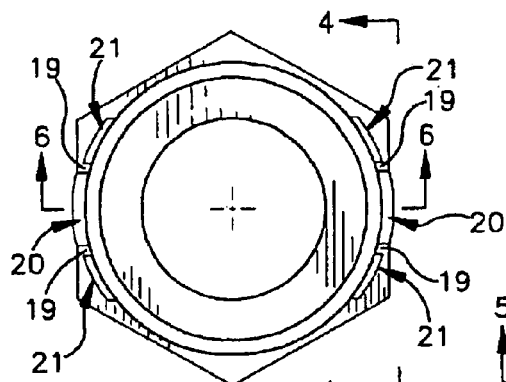
FIG. 3 is an end view of the die cast fitting.
Figure 4:
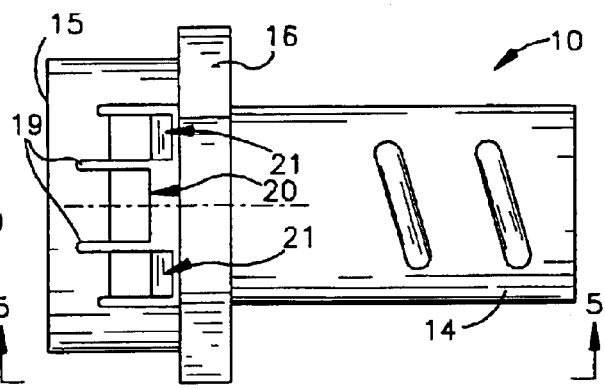
FIG. 4 is a side elevational view taken in the plane of the lines 4—4 of FIG. 3.
Figure 5:
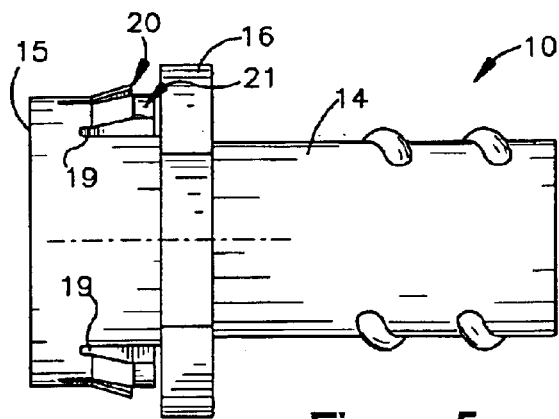
FIG. 5 is an elevational view taken in the plane of the lines 5—5 of FIG. 4.

The snap-in connector of the invention is a one-piece, zinc die-cast fitting generally designated by reference numeral 10. In FIG. 1, the fitting 10 is shown assembled to a junction box 11 through an opening 12 in a wall 13 of the junction box.

The die cast fitting 10 has a trailing end 14 adapted to be connected to flexible metallic conduit or metal clad cable, a cylindrical leading end portion 15 and a radial collar 16. The trailing end 14 can be made to connect various metallic conduit/cable and non-metallic cable in any desired manner and does not form a part of the present invention.

Figure 6:
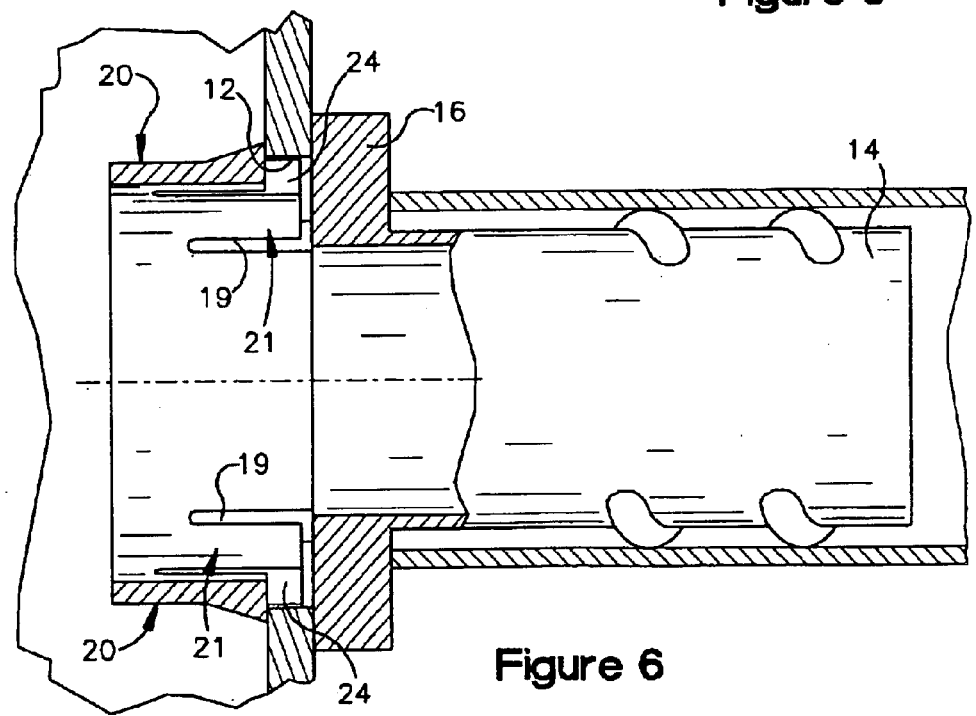
FIG. 6 is an enlarged, fragmentary sectional view showing the fitting of the invention assembled to the wall of the junction box.

The leading end portion 15 is uniquely formed with two locking fingers 20 spaced 180° apart and tensioning fingers 21 adjacent to and on each side of each locking finger 20. As shown, the fingers 20, 21 are separated by notches 19 in the end portion 15 of the die cast fitting 10. The locking fingers 20 spread radially axially outwardly from near the outboard end of the leading end portion 15 toward the collar 16. The free ends 22 of the fingers 21 have exterior cam surfaces 23 that engage the edge of the box opening 12 when the fitting 10 is inserted into the opening. This causes the locking fingers 20 to flex radially inwardly during assembly of the fitting 10 to the junction box 11. As shown in FIGS. 1 and 6, the free ends 22 of the locking fingers 20 are spaced from the face of the collar 16 so as to engage the inside surface of the box wall 13 when the fitting has been fully inserted, thereby capturing the box wall between the fingers 20 and the collar 16.

The free ends 24 of the tensioning fingers 21 have cam surfaces 25 that engage the edge of the box opening 12 so that the fingers are flexed inwardly during insertion of the fitting 10. The free ends 24 terminate closely adjacent the flange or collar 16, whereby the tensioning fingers do not pass completely through the opening 12 of the box wall 13. When the fitting 10 is inserted into the junction box opening with the collar 16 against the outer surface of the box wall 13, as shown in FIG. 6, the fingers 21 are in engagement with the edge of the opening 12. The engagement of the tensioning fingers 21 with the edge of the opening serves to provide firm contact between the fitting 10 and the box 11, as well as keeping the fitting centered in the opening.

In use, the die cast fitting 10 has a snap-fit with the junction box 11 which is accomplished simply by pushing the leading edge 15 into an opening 12 of the junction box 11 which causes the fingers 20, 21 to flex inwardly. The assembly of the fitting to the junction box is facilitated by the outer cam surfaces 23, 25 of the fingers 20, 21, respectively. When the collar 16 is adjacent the outer surface of the box wall 13, the locking fingers 20 are through the opening of the box wall and engage its inner surface to prevent the fitting from being withdrawn. At the same time, the tensioning fingers 21 engage the edge of the opening 12.

As described above, an important feature of the invention is the formation of the fitting as a one-piece die casting that includes flexible locking and tensioning fingers. The ability to die cast the fingers is accomplished by positioning the locking fingers 180° apart and locating the tensioning fingers on each side of the locking fingers.

Many modifications and variations of the invention will be apparent to those skilled in the art in light of the foregoing detailed disclosure. Therefore, it is to be understood that, within the scope of the appended claims, the invention can be practiced otherwise than as specifically shown and described.

What is claimed is:

1. For use with a junction box having a wall with inside and outside surfaces and an opening through said wall, a one-piece, die cast fitting comprising a cylindrical leading end portion that can be inserted into said opening of said junction box, a collar positionable adjacent said outside wall surface of the junction box, two locking fingers spaced 180° apart spreading radially axially outwardly from said leading end portion toward said collar, said locking fingers having free ends that engage said inside wall surface of said junction box when said leading end portion is inserted through said opening, whereby said wall of said junction box is captured between said collar and said free ends of said fingers, tensioning fingers adjacent to and on each side of said locking fingers, said tensioning fingers spreading radially axially outwardly from said end portion toward said collar so as to engage the edge of said opening when said end portion has been inserted therein, and notches separating said locking fingers from the adjacent tensioning fingers and forming the edges of adjacent fingers, whereby said fingers can flex to permit said one-piece die cast fitting to be engaged in said opening of said junction box.

2. A one-piece, die cast fitting comprising a cylindrical leading end portion, a radial collar, two locking fingers spaced 180° apart spreading radially axially outwardly from said leading end portion toward said collar, said locking fingers having free ends spaced from said collar, tensioning fingers adjacent to and on each side of said locking fingers, said tensioning fingers spreading outwardly from said end portion toward said collar and having free ends that are closer to said collar than said free ends of said locking fingers, and notches separating said locking fingers from the adjacent tensioning fingers and forming the edges of adjacent fingers, whereby said fingers can flex to permit said one-piece die cast fitting to be engaged in an opening of a junction box.

3. A one-piece, die cast fitting comprising a cylindrical end portion, a radial collar, two locking fingers spaced 180° apart that spread outwardly from said cylindrical end portion towards said collar, said locking fingers having free ends that can be flexed radially inwardly toward the axis of said cylindrical end portion, tensioning fingers adjacent to and on each side of said locking fingers, said tensioning fingers spreading outwardly from said cylindrical end portion toward said collar, said tensioning fingers being flexible radially inwardly of said cylindrical end portion and having free ends closer to said collar than said free ends of said locking fingers, and notches separating said locking fingers from the adjacent tensioning fingers and forming the edges of adjacent fingers, whereby said fingers can flex to permit said one-piece die cast fitting to be engaged in an opening of a junction box.

* * * * *